Sept. 16, 1969　　　　　H. P. CROFT　　　　　3,467,765
SOLDER COMPOSITION
Filed Oct. 4, 1965
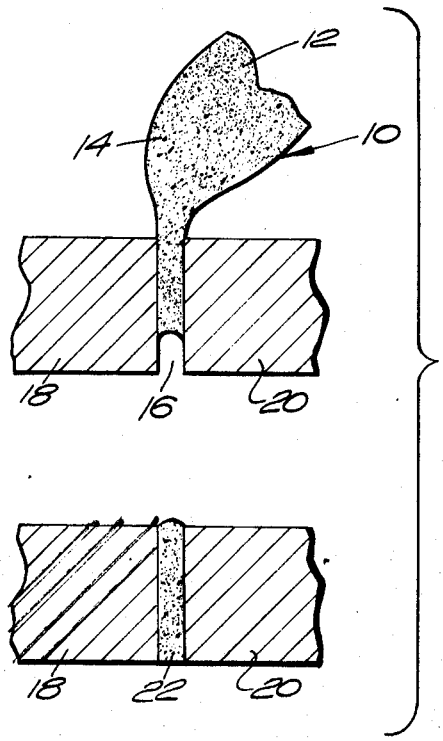
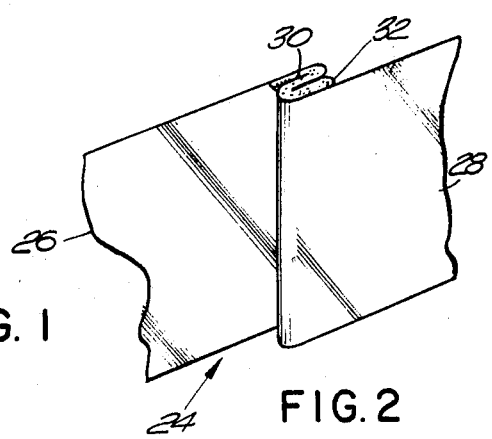
FIG. 1
FIG. 2
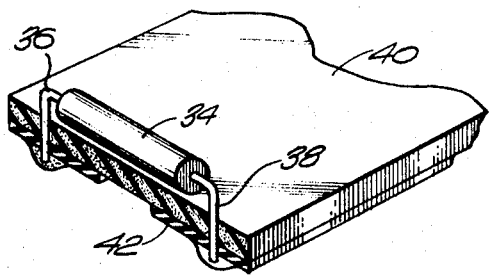
FIG. 3
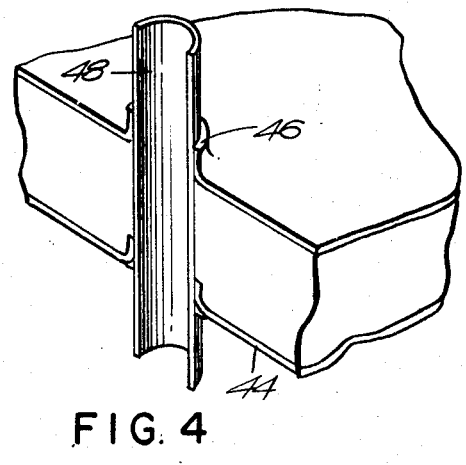
FIG. 4
INVENTOR.
Harry P. Croft
BY Morse, Altman & Oates
ATTORNEYS – # United States Patent Office 3,467,765
Patented Sept. 16, 1969

3,467,765
SOLDER COMPOSITION
Harry P. Croft, Westport, Conn., assignor to Contemporary Research, Inc., Waltham, Mass., a corporation of Delaware
Filed Oct. 4, 1965, Ser. No. 492,808
Int. Cl. H02g *15/08;* H05k *1/00;* B23k *31/02*
U.S. Cl. 174—94                    10 Claims

ABSTRACT OF THE DISCLOSURE

A novel tin-lead solder, having dispersed particles composed of an inert refractory compound, retains its strength together with its high electrical and heat conductivity to temperatures just under the melting point. When above the melting point, the solder is able to flow under capillary action.

---

The present invention relates to solder compositions and processes of the type useful in effecting fluid-tight metal seals, establishing electrical metal connections and bonding metallic parts together and, more particularly, to novel solder compositions and processes characterized by an unusual combination of good wetting ability at a predeterminedly low temperature and freedom from softening at a predeterminedly high temperature.

Typical solder compositions include tin and lead in various proportions, i.e. 40 to 60, 30 to 70 and 23 to 77, depending upon the melting point desired. The eutectic alloy of tin and lead, i.e. lead—38% and tin—62% has a single melting point at 183° C. However, proportions of tin to lead ranging between approximately 20 to 80 and approximately 95 to 5 are characterized by liquid—solid mixtures at temperatures approximately between 180° C. and 320° C. Metals, including antimony, bismuth, cadmium, silver and arsenic have been added to the tin and lead alloy in order to select melting point, enhance wetting below the melting point and improve strength above the melting point. However, desired control of melting point, wetting and strength has not been achieved with such additive metals, particularly without increasing cost of materials or without intensifying corrosion susceptibility.

The primary object of the present invention is to provide a solder, characteristically containing tin and lead, in which desired melting point may be selected, good wetting ability may be maintained above the melting point and increased strength may be achieved below the melting point, by virtue of uniform dispersion in the alloy of a limited quantity of certain minute, insoluble refractory particles. The refractory particles, which are uniformly distributed, characteristically range in maximum extent at most up to 10 microns, range from 0.01 to 15% of the total volume of the composition and are composed of a relatively inert compound. The limited quantity, minute size and inert character of the refractory particles are believed to neither chemically nor physically interfere with the capillary characteristics of the composition when liquid and yet to stabilize the microstructure of the composition when solid.

Other objects of the present invention will impart the obvious and will in part appear hereinafter.

The invention accordingly comprises the materials and processes involving the sequence and combination of steps and components which are exemplified in the following detailed disclosure, the scope of which will be indicated in the appended claims. For a fuller understanding of the nature and objects of the present invention, reference should be had to the following detailed description, taken in connection with the accompanying drawings wherein:

FIG. 1 is an exaggerated and distorted cross-sectional view of materials undergoing a process of the present invention and of the resulting composition;

FIG. 2 illustrates an application of the composition of FIG. 1 in mechanically sealing the joint between metal parts of a sheet metal construction;

FIG. 3 illustrates an application of the composition of FIG. 1 in electrically connecting terminals of electronic circuit components; and FIG. 4 illustrates an application of the composition of FIG. 1 in mechanically sealing the joints between metal parts of a heat exchanger.

Generally, as shown in FIG. 1, the process of the present invention involves the steps of: liquefying a solder composition 10 having an outer phase 12 containing tin and lead as its characteristic ingredients and an inner phase 14 in the form of fine particles of an inert inorganic compound; flowing the solder composition by capillary action into contact with surfaces at the joint 16 between two metallic parts 18, 20 while preventing interference with wetting by the limited dimensions and concentration of the fine particles; and solidifying the solder composition while in such contact at 22 with the inner phase dispersed throughout the outer phase in sufficient quantity to increase the strength of the composition.

Generally, the tin/lead ratio of the external phase ranges from approximately 1/99 to approximately 65/35. The particles of the internal phase range from 0.01 to 15% by total volume of the solder composition and at least approximately 90% of the particles range between 0.01 and 10.0 microns in maximum extent. In certain embodiments of the present invention, the external phase contains also a metal selected from the class consisting of antimony, bismuth, cadmium, silver and arsenic, this metal being present in an amount ranging from 0 to 5% by weight of the external phase. Preferably, the inert compound of the internal phase particles are composed is an inorganic oxide, carbide, boride, nitride, sulfide silicide or phosphide. Such solders are selected for melting points between 175 and 325° C. In practice, the inert particulate compound is introduced into the melt by ultrasonic stirring, via a high velocity gas stream of the type provided by a plasma torch, etc.

FIG. 2, partly broken away, shows a sheet metal container 24 including panels 26, 28 having interlocking, reversely bent flanges 30, 32. The seam formed by these flanges is sealed and locked by a composition having an external phase consisting of tin—40% and lead—60%, and an internal phase consisting of 10% aluminum oxide by total weight of the composition in the form of particles of the order of 1 micron in magnitude. In another form, silicon oxide is substituted for aluminum oxide.

FIG. 3, partly broken away, shows a resistor 34 having terminals 36, 38 affixed to a printed circuit board, which includes as bonded strata an insulating layer 40 and a conducting maze 42. The terminals of the resistor are electrically and mechanically joined to the maze by a solder composition having: an external phase consisting of tin—1.5%, silver—1% and lead—remainder; and an internal phase consisting of 10% aluminum oxide by total weight of the composition in the form of particles of the order of 1 micron in magnitude. In another from silicon oxide is substituted for aluminum oxide.

FIG. 4, partly broken away, shows a heat exchanger having a plurality of metal plates 44 each provided with annularly flanged openings 46, through which a hollow tube 48 projects. The joints between the tube and flanges are joined by a solder composition having: an external phase consisting of tin—1.5%, silver—1% and lead—remainder; and an internal phase consisting of 10% aluminum oxide by total weight of the composition in the form of particles of the order of 1 micron in magnitude. In another form silicon oxide is substituted for aluminum oxide.

When in operation as a result of the presence of the dispersed refractory particles in the solder, wetting by the tin-lead phase is largely unaffected but the strength of the solder as a whole is maintained at unusually elevated temperatures. Since certain changes may be made in the foregoing disclosure without departing from the invention herein, it is intended that all matter set forth in the foregoing description or shown in the accompanying drawings be interpreted in an illustrative and not in a limiting sense.

I claim:

1. A solder comprising an external phase containing lead and tin, at least 95% of said external phase by weight consisting of said lead and tin, and an internal phase containing refractory particles, the tin/lead ratio ranging between 1/99 and 65/35, said internal phase, by total volume of said solder ranging from 0.01 to 15%, said external phase by total weight of said solder ranging from 99.9 to 85%, the particles of said internal phase ranging in maximum extent from 0.01 to 10.0 microns and being composed of an inert compound selected from the class consisting of inorganic oxides, carbides, borides, nitrides, sulfides, silicides and phosphides, whereby the wetting characteristics of said solder are improved at temperatures just below the melting point of said solder, said external phase having a melting point and said solder being a liquid in the temperature range between 175 and 325° C., said solder being subject to flow by capillary action.

2. A process of soldering two metallic parts together, said process comprising the steps of flowing liquid solder at a temperature ranging between 175 and 325° C. into the joint between said parts by capillary action, said solder comprising an external phase containing lead and tin, at least 95% of said external phase by weight consisting of said lead and tin, and an internal phase containing refractory particles, the tin/lead ratio ranging between 1/99 and 65/35 said internal phase, by total weight of said solder, ranging from 0.01 to 15%, said external phase by total weight of said solder ranging from 99.9 to 35%, the particles of said internal phase ranging in maximum extent below 10 microns and being an inert compound selected from the class consisting of inorganic oxides, carbides, borides, nitrides, sulfides, silicides and phosphides, and cooling said solder to room temperature.

3. The process of claim 2, wherein said two metallic parts are interlocked at said joint.

4. The process of claim 2 wherein said two metallic parts are electronic components.

5. The solder of claim 1 wherein said refractory particles are composed of aluminum oxide.

6. The process of claim 1 wherein said refractory particles are composed of aluminum oxide.

7. A product comprising a joint between two metallic parts, said joint including contiguous portions of said metallic parts and a solder bonding said contiguous portions of said metallic parts together, said solder comprising an external phase containing lead and tin, at least 95% of said external phase by weight consisting of said lead and tin, and an internal phase containing refractory particles, the tin/lead ratio ranging between 1/99 and 65/35, said internal phase, by total volume of said solder ranging from 0.01 to 15%, said external phase by total weight of said solder ranging from 99.9 to 85%, the particles of said internal phase ranging in maximum extent from 0.01 to 10.0 microns and being an inert compound selected from the class consisting of inorganic oxides, carbides, borides, nitrides, sulfides, silicides and phosphides, whereby the wetting characteristics of said external phase are substantially as they would be if the internal phase were not present but the strength characteristics of said solder are improved at temperatures just below the melting point of said solder, said external phase having a melting point, said solder being a liquid in the temperature range between 175 and 325° C. and being subject to capillary action in said temperature range.

8. The product of claim 7 in the form of a sheet metal container, said two metal parts being components of said sheet metal container, said contiguous portions of said two metal parts being interlocking flanges.

9. The product of claim 7 in the form of an electrical circuit, said contiguous portions of said two metal parts being electrical conductors, said solder not appreciably affecting the electrical conductivity between said two metal parts.

10. The product of claim 7 in the form of a heat exchanger, said contiguous portions of said two metal parts being hollow tubes and plates, said solder not appreciably affecting the thermal conductivity between said two metal parts.

References Cited

UNITED STATES PATENTS

| | | | |
|---|---|---|---|
| 243,232 | 6/1881 | Fancher | 29—501 X |
| 370,404 | 9/1887 | Norton | 29—501 X |
| 1,281,126 | 10/1918 | Bevan. | |
| 2,220,961 | 11/1940 | Kern | 29—504 X |
| 2,362,893 | 11/1944 | Durst | 29—504 X |
| 2,606,362 | 8/1952 | Martin et al. | 29—504 X |
| 2,671,844 | 3/1954 | Laubmeyer et al. | 29—504 X |
| 3,029,505 | 4/1962 | Reichenbaum | 29—501 |
| 3,110,571 | 11/1963 | Alexander | 29—473.1 X |
| 3,163,500 | 12/1964 | Konrad et al. | 29—504 X |
| 3,214,827 | 11/1965 | Phohofsky | 29—503 X |

JOHN F. CAMPBELL, Primary Examiner

D. C. REILEY, Assistant Examiner

U.S. Cl. X.R.

29—503; 165—177; 174—68.5; 220—76; 228—56; 287—189.36